Patented July 4, 1933

1,916,812

UNITED STATES PATENT OFFICE

BAYARD S. SCOTLAND, OF JOLIET, ILLINOIS

MACARONI AND METHOD OF MAKING THE SAME

No Drawing.   Application filed March 20, 1931.   Serial No. 524,218.

The invention relates to improvements in macaroni and alimentary pastes and methods of making the same and has for its primary object the provision of an improved macaroni product having thin walls and capable of sufficiently retaining its form during cooking to facilitate the cooking and to present a highly desirable food product.

Other objects will appear hereinafter.

The invention consists in the food product and method of preparing the same hereinafter described and claimed.

In carrying on the process, the usual dough mixture is prepared, with the addition of a suitable quantity of 5% liquid egg white. The dough thus prepared is then treated in the usual way to form the usual tubular sections in which macaroni is usually placed upon the market, but the walls of said tubes are made relatively thin in comparison with their diameters. The sections thus prepared are then dried in the usual way and are ready for marketing and use.

A macaroni product having relatively thin walls is highly desirable for several reasons. Obviously, the thinner the walls of the tubular section of macaroni, the quicker and more thoroughly it will cook tender and the more palatable it will be in eating, because of the more thorough penetration of flavoring and seasoning. It is also highly desirable, if not essential, that the macaroni retain substantially its tubular form during the cooking process. Obviously, if the tubular sections collapse and flatten during the cooking process, the food when cooked will present an unattractive, non-appetizing mass. It is also apparent that the collapsing of the tubes during cooking prevents access of the cooking liquid and seasoning and flavoring juices to the interior walls, thereby rendering thorough cooking and flavoring more difficult.

Heretofore it has been the custom to make macaroni with tubes sufficiently thick, with reference to their diameters, so that said tubes will retain open tubular form during the cooking process. Obviously the thicker the walls, the longer the cooking process must be continued and the less thorough both the cooking and the flavoring will be. I have found that a macaroni product prepared as above set forth can be made with relatively thin walls and yet will hold its tubular form during cooking, with the above indicated desirable results.

While I have set forth in detail the preferred form of the product and method of producing the same, these are capable of variation and modification without departing from the spirit of the invention. I therefore do not wish to be limited to the precise details set forth, but desire to avail myself of such variations and modifications as fall within the scope of the appended claims.

Having thus fully described my invention, what I claim as new and desire to secure by Letters Patent is:

1. The method of making macaroni which consists in forming a dough containing uncooked flour and uncooked white only of eggs; forming thin walled tubular sections from said dough; and then drying said sections.

2. The method of making macaroni which consists in forming a dough containing flour and the white only of eggs; forming thin walled tubular sections from said dough; and then drying said sections.

3. The method of making macaroni which consists in forming a dough containing uncooked flour and 5% uncooked liquid white only of eggs; forming thin walled tubular sections from said dough; and then drying said sections.

In witness whereof, I have hereunto set my hand this 27 day of February, 1931.

BAYARD S. SCOTLAND.